(12) United States Patent
Ishikawa et al.

(10) Patent No.: US 8,040,475 B2
(45) Date of Patent: Oct. 18, 2011

(54) REFLECTIVE MORPHABLE DISPLAY DEVICE AND METHOD OF FEATURE ACTIVATION

(75) Inventors: Tomohiro Ishikawa, Evanston, IL (US);
Andrew N Cady, Chicago, IL (US);
Robert D Polak, Lindenhurst, IL (US);
Kenneth A. Dean, Phoenix, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 421 days.

(21) Appl. No.: 12/254,720

(22) Filed: Oct. 20, 2008

(65) Prior Publication Data
US 2010/0097549 A1   Apr. 22, 2010

(51) Int. Cl.
*G02F 1/1335* (2006.01)
(52) U.S. Cl. .......................................... 349/115; 349/96
(58) Field of Classification Search ............... 349/96, 349/115
See application file for complete search history.

(56) References Cited

U.S. PATENT DOCUMENTS

| | | | |
|---|---|---|---|
| 4,032,218 A * | 6/1977 | Scheffer | 349/115 |
| 5,548,422 A * | 8/1996 | Conner et al. | 349/98 |
| 6,757,039 B2 * | 6/2004 | Ma | 349/115 |
| 7,760,296 B2 * | 7/2010 | Gotink-Meinders et al. | 349/114 |

* cited by examiner

*Primary Examiner* — Eric Wong

(57) ABSTRACT

Disclosed is reflective morphable display with multi-layered depth viewing, low power consumption and few components and a method of activating various features thereof. The disclosed display includes a bi-stable reflective cholesteric liquid display crystal (ChLCD) layered in combination with a display device such as an LCD and a quarter lambda ($\lambda/4$) retardation film layer. Linearly polarized light emerging from the front surface of a display device is circularly polarized by the $\lambda/4$ layer before entering the ChLCD layer. In its reflective state, the ChLCD layer receiving a portion of the ambient light having the same handedness of the ChLCD is reflected in a mirror-like manner. Also in its reflective state, when it receives light that is circularly polarized by the $\lambda/4$ retardation film layer, the ChLCD layer acts as a shutter. A display device with depth viewing is provided as the ChLCD layer pixelated so it is configured to display font and/or other indicia.

20 Claims, 6 Drawing Sheets

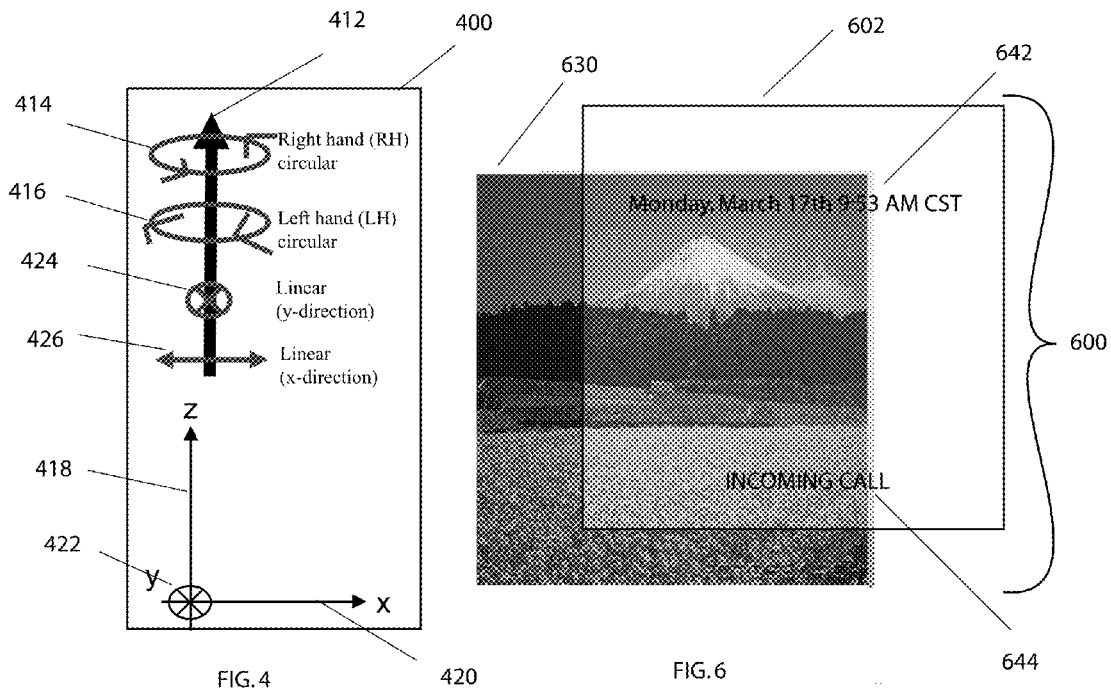
FIG. 4
FIG. 6
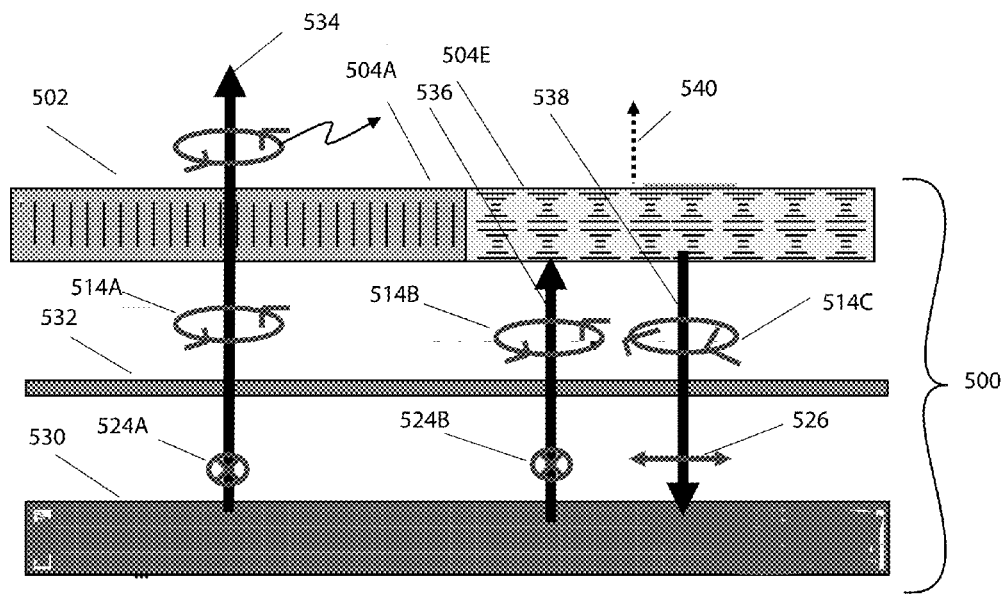
FIG. 5

US 8,040,475 B2

REFLECTIVE MORPHABLE DISPLAY DEVICE AND METHOD OF FEATURE ACTIVATION

FIELD

Disclosed is reflective morphable display with multi-layered depth viewing, low power consumption and few components and a method of activating various features thereof, and more particularly a display including a bi-stable reflective cholesteric liquid display crystal (ChLCD) layered in combination with a display device such as an LCD and a quarter lambda ($\lambda/4$) retardation film layer.

BACKGROUND

Manufacturers constantly strive to differentiate their products from those of others available in the same market. In the mobile communication device market a desirable design feature is a morphable, smart or stealth display, keypad, button, key or indicator which may be illuminated when a particular function, mode or application is active and otherwise darkened. To simplify a user interface of a device to include particular features of interest, a morphing effect typically blackens all or certain portions of a display, keypad, button, key or indicator, leaving illuminated those of interest.

A "switchable" lens or shutter provides a morphing effect. For example, a normally black twisted pneumatic liquid crystal display (TN-LCD) is used as a shutter. In the open state, a voltage is constantly applied to the shutter so that it is transparent. In the off state a black uniform appearance is enabled. For reflective states giving a mirror effect, a combination dual brightness enhancement film Dual Brightness Enhancement Film (DBEF) with TN-LCD and a plurality of polarizers is required, leading to an increased number of components.

Another desirable feature is a display with depth viewing, similar to three dimensional (3D) displays. Layering of displays also allows display of multiple types of information at the various levels. For example, two transmissive LCDs may be used for a depth viewing display. However, the front LCD of the two LCDs requires constant power for use in either the clear state or the display state. Layered displays require high power consumption.

BRIEF DESCRIPTION OF THE DRAWINGS

FIG. 4 is a legend 400 illustrating light polarization symbols used in FIGS. 5, 7, 9 and 11 below;

FIG. 5 illustrates an embodiment of a display in a low ambient light condition, the display including a display device configured to transmit linearly polarized light in an on state and to absorb linearly polarized light in an off state;

FIG. 6 depicts a display as a top view of the display of FIG. 5;

DETAILED DESCRIPTION

Figure 1:
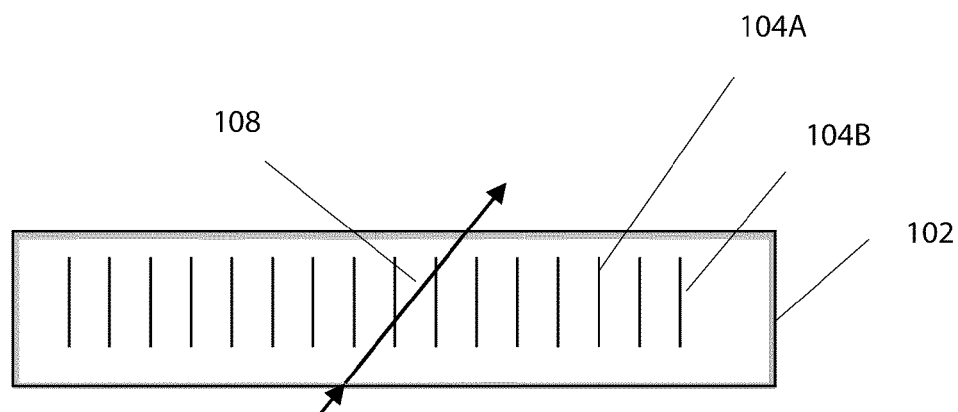
FIG. 1 illustrates molecular orientation of the most transmissive state, the homeotropic state in which power is required to maintain its transmissivity.

A reflective morphable display with multi-layered depth viewing, low power consumption and few components is highly desirable. Additionally, a mirror-like morphable display that may exhibit true red and other vivid colors is also highly desirable. Disclosed is a bi-stable reflective cholesteric liquid display crystal (ChLCD) layered in combination with a display device such as an LCD and a quarter lambda ($\lambda/4$) retardation film layer.

The molecules of ChLCD in their bi-stable states are arranged in a helical structure. A property of bi-stable ChLCD is to reflect circularly polarized light of a particular handedness, either right-handed (RH) or left-handed (LH) when in its reflective state. The ChLCD layer has two different transmissive states and a reflective state. In a less transmissive state, one of the bi-stable states, that is, the hazy-transparency of the focal conic (FC) state, no power is required to maintain its transmissivity. In a most transmissive state, the non-stable homeotropic state, power is required to maintain its transmissivity. Accordingly, in the bi-stable states, no power is required to maintain those states. Power is required to change states. The mirror-like reflection by the ChLCD of the disclosed display is highly desirable.

Linearly polarized light emerging from the front surface of an LCD is circularly polarized by the $\lambda/4$ retardation film layer before entering the ChLCD layer. In its reflective state, the ChLCD layer receiving ambient light of the same handedness of the ChLCD is reflected in a mirror-like manner. Also in its reflective state, when it receives light that is circularly polarized by the $\lambda/4$ retardation film layer, the ChLCD layer acts as a shutter. The $\lambda/4$ retardation film layer transforms linearly polarized light passing through it in either direction along a first axis, for example the y-direction to circularly polarized light. In the other direction the $\lambda/4$ retardation film layer transforms the same handedness circularly polarized light to linearly polarized light along a second axis, for example, the x-direction. A user's eye cannot distinguish between different types of polarization but can distinguish intensity and color.

In the one embodiment of the disclosed display, the ChLCD layer is pixelated so it is configured to display font and/or other indicia. In this way, a display device with depth viewing is provided with few components for a thin profile and which is capable of low power consumption. For example, in a transmissive state, the ChLCD layer can display indicia and allow light from an LCD to pass therethrough as well. This allows a portable electronic device to display information continuously using negligible power by employing a bistable or ultra-low power reflective display. The problem with bistable and low power reflective displays is that they are too slow to produce video images with at least fifteen frames per second. By combining the bistable display with an underlying display, "always on" information and video images can also be produced by the same surface.

As mentioned, the mirror-like reflection by the ChLCD of the disclosed display is highly desirable. For a single layer of ChLCD, this reflection is tuned to a range of wavelengths, and 30% to 40% of the light at this wavelength is reflected, all in a polarization handedness corresponding to the reflective state. The remaining light, including light out of the reflection bandwidth and the other circularly polarized light of the same color pass through the ChLCD module. If this transmitted light reflects off something beyond the ChLCD module (i.e. a white background), a significant fraction can then be transmitted through the ChLCD module and back to a viewer. The result is that the reflected light washes out the reflected color, substantially reducing the color saturation perceived by the viewer. For this reason, ChLCD modules are painted on the backside with a black light-absorbing layer, which absorbs all light passing through the ChLCD module.

It is possible, however, to use an LCD in the "off" or dark state as the black absorbing layer behind a cholesteric liquid crystal module instead of paint. However, some light does reflect off the top surface of an LCD, and contributes to wash-out of the color. Use of a $\lambda/4$ retardation film serves to reduce these reflections.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Figure 2:
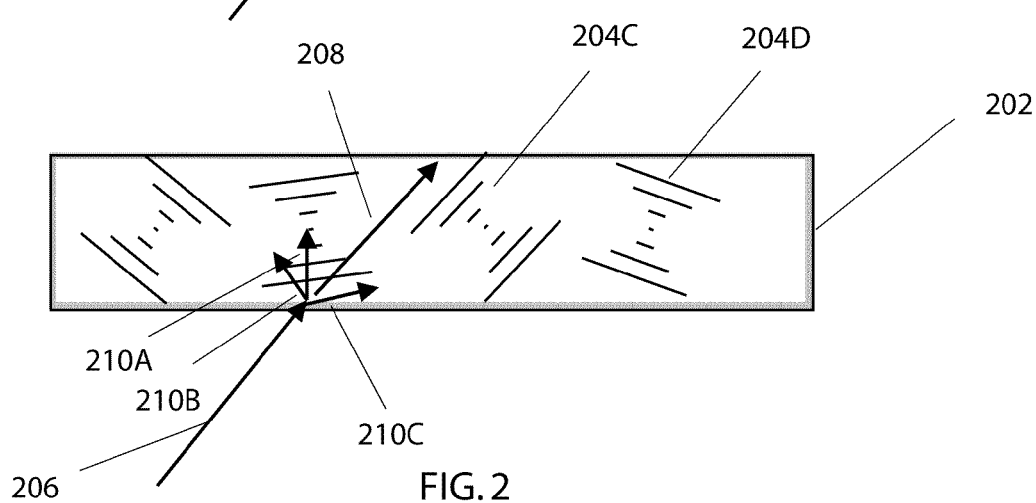
FIG. 2 illustrates molecular orientation of the hazy-transparency state, the focal conic state, in which no power is required to maintain its transmissivity.
Figure 3:
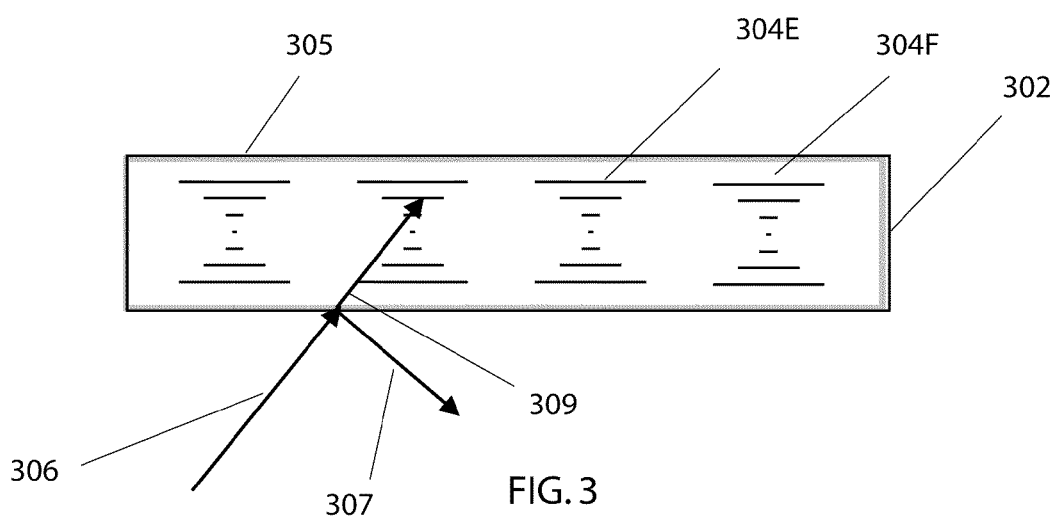
FIG. 3 illustrates molecular orientation of the reflective state with helical structure formed by liquid crystal forming molecules in which no power is required to maintain the reflective state.

FIGS. 1, 2 and 3 illustrate three different states of a cholesteric liquid display crystal (ChLCD). The term "cholesteric liquid crystal" or "cholesteric material" refers to a mesomorphic phase existing in a state of matter intermediate between liquid and crystal. FIG. 1 illustrates the most transmissive state, the homeotropic state in which power is required to maintain its transmissivity. FIG. 2 illustrates the hazy-transparency of the focal conic state in which no power is required to maintain its transmissivity. FIG. 3 illustrates the reflective states' helical structure formed by liquid crystal forming molecules. In the reflective state, the optical length scale pitch selectively reflects light having an appropriate wavelength and a particular sense of circular polarization.

Returning to FIG. 1, the ChLCD layer's 102 liquid crystal molecules 104A and 104B, are depicted by straight lines. The helicies are unwound by a strong electric field, and liquid crystal molecules 104A and 104B do not exhibit a helical structure. An applied voltage provides for low power consumption in the most transmissive state, that is its homeotropic state. Light depicted by arrow 106 will transmit through the ChLCD as depicted by arrow 108 irrespective of its polarization. The ChLCD, in its most transmissive state, allows nearly all light to pass through it but requires power to maintain the state.

Returning to FIG. 2, the ChLCD layer's 202 helicies 204C and 204D are randomly oriented. Light depicted by arrow 206 will transmit through the ChLCD layer 202 as depicted by arrow 208 irrespective of its polarization. However some light depicted by arrows 210A, 210B and 210C is dispersed within the ChLCD layer, causing a hazy-transparency of the layer. In this focal conic (FC) state, one of the two bi-stable states of ChLCD, no power is required to maintain the state. In the FC state an illuminated display such as an LCD may be viewed through the ChLCD layer 202.

Returning to FIG. 3, the reflective state of the ChLCD layer 302 is illustrated. As mentioned, the reflective state can provide a mirror-like morphing effect. The ChLCD layer's 302 helicies 304E and 304F are aligned with axes along the substrate 305 normal. Typically, an ambient light is not polarized and can be considered as a mixture of left and right handed polarized light. Thus, portion of the incoming light 306 having the same handedness of the reflective state is reflected as depicted by an arrow 307, while light having the other handedness transmits, 309. In this second bi-stable state of the cholesteric layer 302, no power is required to maintain the state. As a "switchable" lens or shutter, the ChLCD layer 302 can change between either of the transmissive states (see FIGS. 1 and 2) and the reflective state (FIG. 3) providing a morphing effect to the display.

FIG. 4 is a legend 400 illustrating light polarization symbols used in FIGS. 5, 7, 9 and 11 below. Light is indicated by an arrow 412. As mentioned above, the ChLCD layer 302 (see FIG. 3) is configured to reflect a circularly polarized light with a particular handedness in the reflective state. The handedness may be one of a right hand (RH) circularly polarized light 414 or may be a left hand (LH) circularly polarized light 416 with respect to the light arrow 412. Light that emanates from an LCD is generally linearly polarized light. To illustrate the linearity of the light, a three dimensional Cartesian coordinate graph shows a vertical z-axis 418, a horizontal x-axis 420, and a y-axis 422 going into the page. With reference to the light arrow 412, linearly polarized light (y-direction) 424 and linearly polarized light (x-direction) 426 is illustrated.

FIG. 5 illustrates an embodiment of a display 500 in a low ambient light condition, the display 500 including a display device 530, such as an LCD configured to transmit linearly polarized light in an on state and to absorb linearly polarized light in an off state. Display 500 further includes a bi-stable cholesteric (ChLCD) layer 502 configured to have a reflective state being a stable state (see FIG. 3), a lower transmissivity state being a stable state (see FIG. 2), and a high transmissivity state requiring power to maintain the high transmissivity state (see FIG. 1), the ChLCD layer 502 being configured to reflect a circularly polarized light with a particular handedness in the reflective state. The ChLCD 502 may be pixelated hence the ChLCD layer 502 is depicted with both the transmissive state 504A and the reflective state 504E. Information such as indicia can be displayed by the LCD 530 alone (if the ChLCD layer 502 is all open and transparent) or by a combination of the LCD 530 and the ChLCD 502 to give depth perception.

As discussed above, the transmissive state allows light to pass therethrough irrespective of its polarization. However, as discussed above, the reflective state reflects circularly polarized light having the same handedness of the ChLCD layer. Since the ChLCD layer may be pixelated, portions of the ChLCD layer may be transmissive and portions may be reflective as will be discussed in more detail with respect to FIG. 6 below. Briefly, when light that is transmitted from the display 530 is reflected back by the ChLCD layer 502, the display may appear darkened where the portion of the ChLCD is reflective, providing the morphing effect. Display 500 also includes a single quarter lambda ($\lambda$/4) layer 532 positioned between the LCD display 530 and the cholesteric layer 502 configured to change linearly polarized light of an LCD 530 to light being the circularly polarized light and to change the circularly polarized light transmitted to light being linearly polarized light.

FIG. 5 further shows light depicted by arrow 534 transmitted from the display 530, through the $\lambda$/4 retardation film layer 532 and the ChLCD layer 502. Light 534 transmitted from the display 530 is linearly polarized in the y-direction as indicated by symbol 524A. As the light 534 passes through the $\lambda$/4 layer 532 the light 534 becomes circularly polarized indicated by symbol 514A. In this example the ChLCD is right handed, so the $\lambda$/4 layer 532 would be accordingly chosen to cause linearly polarized light to be right handed circularly polarized light. Of course, light 534 passes through the transmissive side 504A of the ChLCD layer 502 irrespective of its polarization.

Light transmitted by the display 530 indicated by arrow 536 is linearly polarized as indicated by symbol 524B. As the light 536 passes through the $\lambda$/4 layer 532 the light 536 becomes circularly polarized indicated by symbol 514B. Since light 536 is transmitted toward the reflective side 504E of the ChLCD layer 502, it is reflect back toward the display 530 as depicted by arrow 538. As discussed above, the ChLCD layer 502 and the $\lambda$/4 layer 532 are chosen so that light passing through the $\lambda$/4 layer 532 will be circularly polarized in the same handedness of the ChLCD layer. In the described embodiment, the $\lambda$/4 layer 532 circularly polarizes the light 536 so that it is right handed. The ChLCD layer 502 is right handed and therefore reflects the light 536 back as right handed circularly polarized light 514C so that when it passes though the $\lambda$/4 layer 532, it become linearly polarized in the x-direction as indicated by symbol 526. Linear light is absorbed by the display 530. The dotted line 540 represents light that is reflected outward in a low ambient light condition.

FIG. 6 depicts the display 600 as a top view of the display 500 of FIG. 5. Information 642 and 644 is displayed by the ChLCD layer by portions such as portion 504E of the ChLCD layer 502 (see FIG. 5). The combination of the LCD layer 630 and the ChLCD layer 602 provide depth perception when both layers display indicia as shown. The LCD layer 630 and the ChLCD layer 602 are shown in perspective to illustrate that ChLCD layer 602 may be in its FC lower transmissivity state and therefore provide a hazy transparency. Of course, the ChLCD 602 may be in its homeotropic most transmissivity state and therefore provide more transparency. In the depicted layered display 600 application, the font of information 642 and 644 is an image displayed by shuttering light from the LCD layer 630 (in low ambient light) or by reflecting ambient light (in normal to high ambient light).

Figure 7:
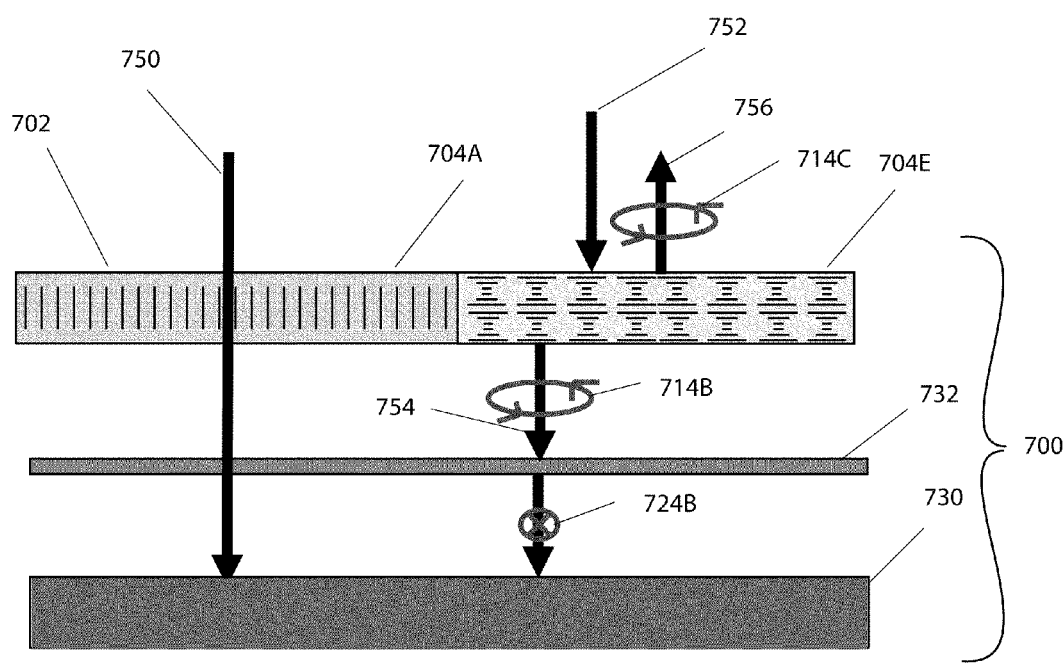
FIG. 7 depicts an embodiment of a display where an LCD layer is in an off state and thus not displaying an image or indicia.

FIG. 7 depicts an embodiment of a display 700 where an LCD layer 730 is in an off state and thus not displaying an image or indicia. An LCD in the off states absorbs linearly polarized light by a combination of the top and the bottom polarizers (not shown) of the LCD layer 730. As discussed above, the ChLCD layer 702 has two different transmissive states and a reflective state. In a most transmissive state, the non-stable homeotropic state, power is required to maintain its transmissivity. In a less transmissive state, one of the bi-stable states, that is, the hazy-transparency of the focal conic (FC) state, no power is required to maintain its transmissivity. In a reflective state, the other of the bi-stable states, no power is required to maintain its reflectivity. Power is required to change states.

FIG. 7 also illustrates that a portion 704A of the ChLCD layer 702 in a most transmissive state. It is understood that instead, that portion may also be in a lower transmissive state where the ChLCD layer 702 can function in a pure bistable operation. Another portion 704E of the ChLCD 702 is illustrated as being in a reflective state which is a pure bistable operation.

Ambient light can be considered as a mixture of left and right handed circularly polarized light or equivalently mixture of x and y linearly polarized light. In either transmissive state, ambient light indicated by arrow 750 can pass through the portion 704A of the ChLCD layer 702. Light 750 is therefore absorbed by the Normally Black (NB) mode of the LCD which as mentioned, acts as an absorber in the off state.

As mentioned above, in the described embodiment, the ChLCD layer 702 is right-handed and therefore reflects right-handed circularly polarized light. The ChLCD 702 will reflect right-handed circularly polarized light being transmitted from any direction. Similarly the ChLCD 702 will allow left-handed circularly polarized light being transmitted from any direction to be transmitted through it.

As mentioned, ambient light is considered to be a mixture of both right-handed and left-handed circularly polarized light. In reflective or planar state portion 704E in this example is a right-handed reflective state. Portion of incoming ambient light indicated by arrow 752 that is left-handed circularly polarized light is therefore transmitted through the ChLCD layer 702. The light indicated by arrow 754 which has been transmitted through the ChLCD 702 is in turn transmitted through the $\lambda$/4 layer 732 that turns left-handed circularly polarized the light 714B into y-direction linearly polarized light 724B, and it is absorbed by the LCD 730, which absorbs linearly polarized light.

As discussed, the example of FIG. 7 depicts the ChLCD layer 702 as reflecting right-handed circularly polarized light. Portion of the ambient light as indicated by arrow 752 incident upon the right-handed ChLCD 702 that is right-hand circularly polarized light 714C is reflected by the right-handed ChLCD 702 as indicated by arrow 756. The reflected light 756 is therefore not absorbed by the LCD layer 730.

Figure 8:
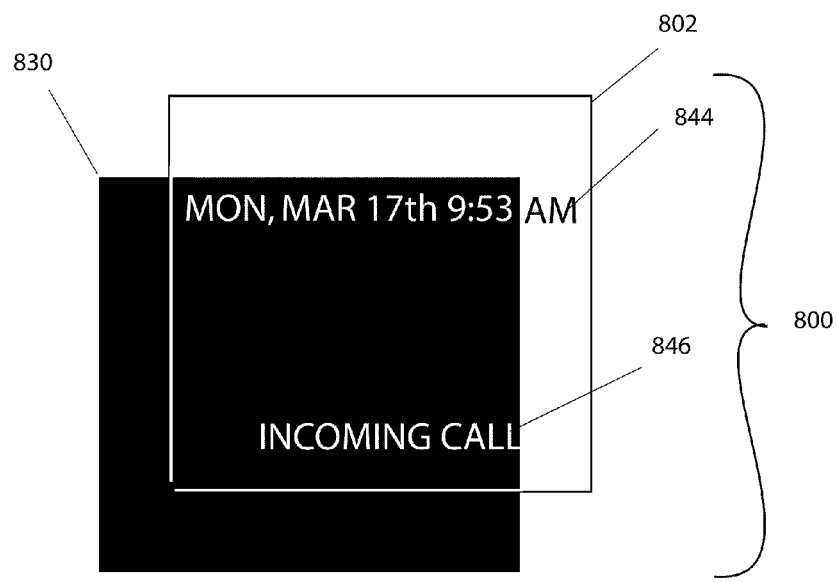
FIG. 8 depicts a display as a top view of the display of FIG. 7.

FIG. 8 depicts the display 800 as a top view of the display 700 of FIG. 7. Information 844 and 846 is displayed by the ChLCD layer by portions 704E of the ChLCD layer 802. The LCD layer 830 and the ChLCD layer 802 are shown in perspective to illustrate that ChLCD layer 802 (see FIG. 7) may be in its FC lower transmissivity state and therefore provide a hazy transparency. Of course, the ChLCD 802 may be in its homeotropic most transmissivity state and therefore provide more transparency. In the depicted layered display 800 application, the displayed text 844 and 846 is an image displayed by reflecting light ambient light 752 (see FIG. 7). It is understood that any type of indicia can be displayed in any of the embodiments illustrated or any possible variations.

Figure 9:
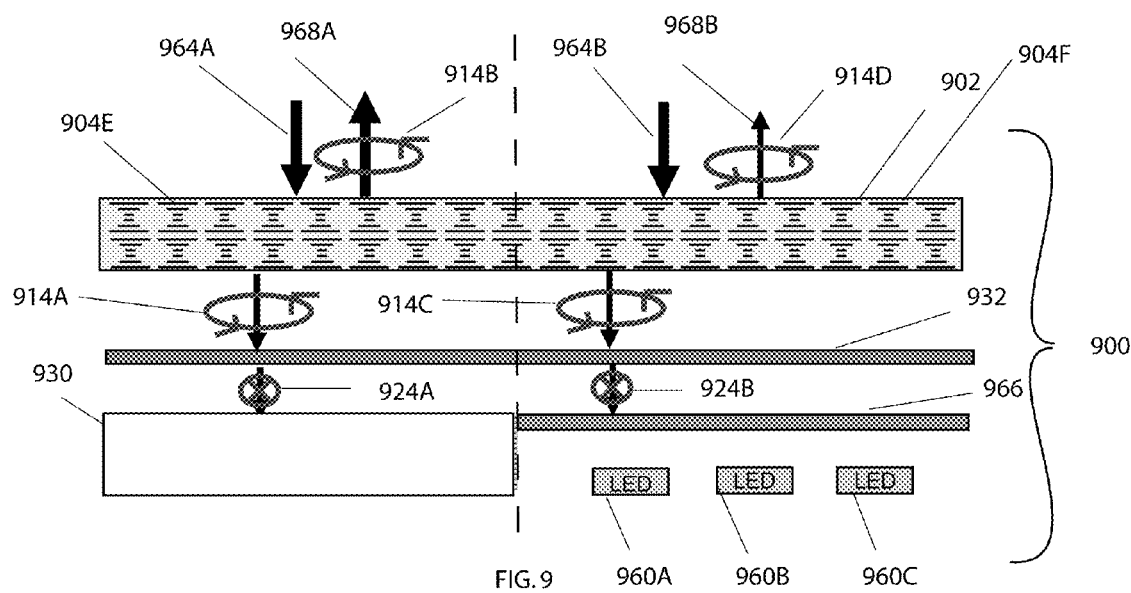
FIG. 9 depicts an embodiment of a display including a ChLCD layer across both an LCD and a set of keypad elements that for example may form a keypad.

FIG. 9 depicts an embodiment of a display 900 including a ChLCD layer 902 across both an LCD 930 and a set of keypad elements 960A, 960B and 960C that for example may form a keypad. FIG. 9 depicts an embodiment of a display 900 where the LCD layer 930 and the set of keypad elements 960A, 960B and 960C is in an off state and thus not transmitting light. As mentioned above, an LCD display 930 in the off states absorbs linearly polarized light by a combination of the top and the bottom polarizer (not shown) of the LCD layer 730. However, in ambient light indicated by arrows 964A and 964B the key pad elements 960A, 960B and 960C may be visible in the absence of one or more additional filters. An additional polarizer 966 between the set of keypad elements 960A, 960B and 960C and the λ/4 layer 932 may prevent the difference in reflectivity between them.

As mentioned above, ambient light is a combination of both right-handed and left-handed circularly polarized light. In reflective or planar state portion in this example is a right-handed reflective state 904E and 904F. A portion of the incoming ambient light indicated by arrows 964A and 964B that is left-handed circularly polarized light 914A and 914C is therefore transmitted through the ChLCD layer 902. The left-handed circular polarizer light 914A is transmitted through the portion ChLCD 902 over the LCD layer 930 is in turn transmitted through the λ/4 layer 932 and is transformed to light 914A into y-direction linearly polarized light 924A. This linearly polarized in the y-direction 924A is absorbed by the LCD 730, which absorbs linearly polarized light.

As similarly discussed above with respect to FIG. 7, the example of FIG. 9 depicts the ChLCD layer 902 as reflecting right-handed circularly polarized light. A portion of ambient light as indicated by arrow 964A incident upon the ChLCD 902 that is right-hand circularly polarized light 914B is reflected by the right-handed ChLCD 902 as indicated by arrow 968A. The reflected light 968A is therefore not absorbed by the LCD layer 930. The reflected light 968A causes the ChLCD 902 to have a mirror-like appearance.

As mentioned, in ambient light indicated by arrow 964B the key pad elements 960A, 960B and 960C may be visible in the absence of one or more additional filters. An additional polarizer 966 above the set of keypad elements 960A, 960B and 960C may prevent the reflection different between them. On the side of display 900 having the keypad elements 960A, 960B and 960C, in the reflective or planar state portion in this example is a right-handed reflective state 904F. A portion of the incoming ambient light indicated by arrows 964B that is left-handed circularly polarized light is therefore transmitted through the ChLCD layer 902. The light 964B which is transmitted through the portion ChLCD 902 over the LCD layer 930 is in turn transmitted through the λ/4 layer 932 that turns left-handed circularly polarized light 914C into y-direction linearly polarized light 924B. This linearly polarized in the y-direction 924B, however, is not absorbed by the keypad elements 960A, 960B and 960C. Thus, the additional polarizer 966 can be inserted such that it absorbs linearly polarized light in y-direction. The additional polarizer 966 between the set of keypad elements 960A, 960B and 960C may prevent the reflection different between them. The reflected light 968B that is right-handed circularly polarized light causes the ChLCD 902 to have a mirror-like appearance.

In another embodiment, the cholesteric layer 902 can be tuned to a wavelength range (i.e. green). The red and blue passing though the ChLCD module 900 needs to be absorbed, since this light is not circularly polarized. Optional filters can be placed between the LEDs and other portions of the ChLCD module 900 to remove these wavelengths. This is especially helpful if the filter has pass bands for the LED wavelengths.

Figure 10:
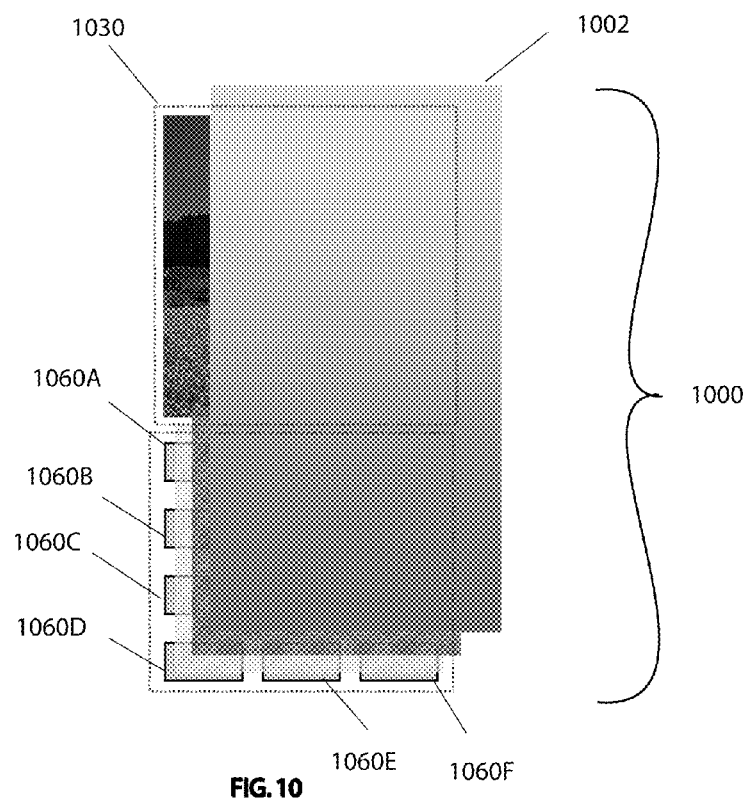
FIG. 10 depicts a display as a top view of the display of FIG. 9.

FIG. 10 depicts the display 1000 as a top view of the display 900 of FIG. 9. The display 1030 and keypad elements 1060A, 1060B, 1060C, 1060D, 1060E, and 1060F are below the ChLCD layer 1002. When the display 1030 and keypad elements 1060A, 1060B, 1060C, 1060D, 1060E, and 1060F are in the off state, the display 1000 can be in a full morphing application. The front ChLCD layer 1002 can maintain its reflective state, hiding the display 1030 and keypad elements 1060A, 1060B, 1060C, 1060D, 1060E, and 1060F portions. As discussed above, the keypad portion may be under a separate polarizer 966 (see FIG. 9).

Figure 11:
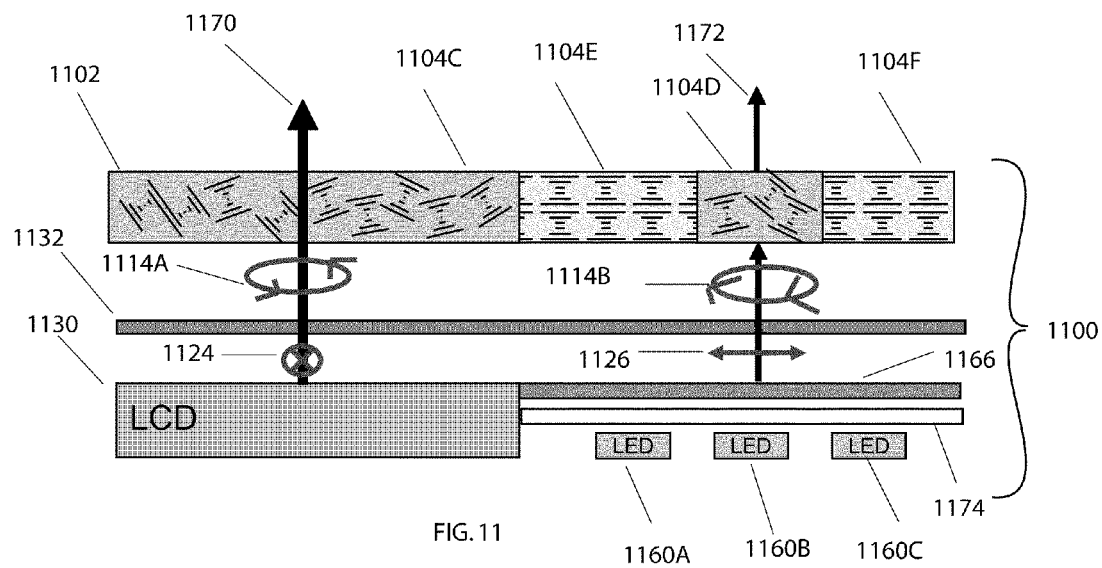
FIG. 11 depicts an embodiment of a display including a ChLCD layer across both an LCD and a set of keypad elements that for example may form a keypad, the display including a dual brightness enhancement film.

FIG. 11 depicts an embodiment of a display 1100 including a ChLCD layer 1102 across both an LCD 1130 and a set of keypad elements 1160A, 1160B and 1160C that for example may form a keypad. In this example, the portions of the ChLCD are in a transmissive mode and portions are in a reflective mode. A discussed above, the ChLCD layer 1102 has two different transmissive states and a reflective state. In a most transmissive state, the non-stable homeotropic state, power is required to maintain its transmissivity. In a less transmissive state, one of the bi-stable states, that is, the hazy-transparency of the focal conic (FC) state, no power is required to maintain its transmissivity. In a reflective state, the other of the bi-stable states, no power is required to maintain its reflectivity. Power is required to change states. In this example, the portions 1104C and 1104D that are transmissive are depicted as the less transmissive state, the FC state. Portions 1104E and 1104F are in the reflective state.

As similarly depicted in FIG. 5, LCD display 1130 is on, and transmits y-direction linearly polarized light 1124 through the λ/4 layer 1132 which circularly polarizes 1114A the light 1170 so that it is right-handed. Of course, light 1170 passes through the transmissive portion 1104C of the ChLCD layer 1102 irrespective of its polarization.

The ChLCD layer 1102 over the keypad elements 1160A, 1160B and 1160C, in this example is pixelated so that portions over different keypad elements are either in a transmissive state or a reflective state. Portion 1104D is in the less transmissive state the FC state. If haze is an issue, portion 1104C can be switched into the more transmissive state, the homeotropic state. Portions 1104E and 1104F are in a reflective state, the planar state. For simplicity, the keypad elements 1160A and 116C are off as they are in FIG. 9.

In low ambient light conditions, the LED of the keypad element 1160B is on for key pad indication. In that case, light indicated by arrow 1172 is transmitted from the LED of the keypad element 1160B. An LED typically emits unpolarized light, (although scientists have reported demonstrating polarized LEDs which are, as yet, many years from production). A polarized light transmitting LED requires more power than one that transmits unpolarized light. In the described low ambient light condition 50% of the light may be absorbed by the polarizer 1166. The polarizer 1166 polarizes the light 1172 of the LED so that it is y-direction polarized light that when passing through the λ/4 retardation film layer 1132 becomes right-handed circularly polarized light which is transmitted through the ChLCD layer 1102. Again, however, light 1170 passes through the transmissive portion 1104C of the ChLCD layer 1102 irrespective of its polarization. Optionally a dual brightness enhancement film (DBEF) 1174 which is available from 3M is between the polarizer 1166 and, for example, a keypad element 1160B to increase the brightness of the LED due to the absorption of light by the polarizer 1166. The DBEF 1174 recycles the polarized light leading to more efficient use of the light emitted by LED.

In high ambient light conditions, the LED of the keypad element 1160B may be turned off. The keypad element 1160B may be visible between the reflection of the ChLCD layer 1102 and through the polarizer 1166. An ambient light detector may be used to detect ambient light conditions.

Figure 12:
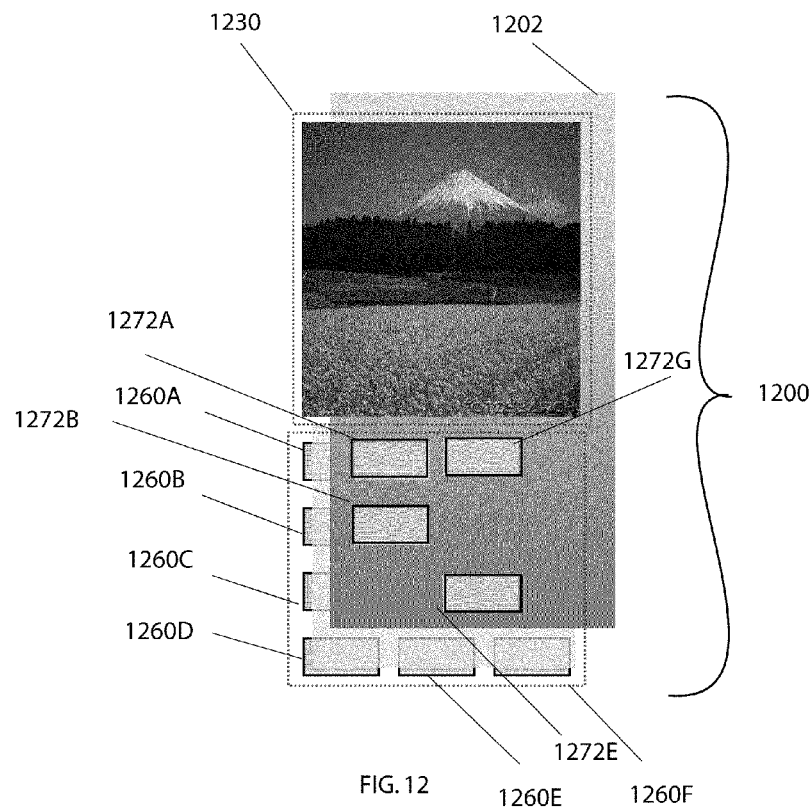
FIG. 12 depicts a display as a top view of the display of FIG. 1.

FIG. 12 depicts the display 1200 as a top view of the display 1100 of FIG. 11. The display 1230 and keypad elements 1260A, 1260B, 1260C, 1260D, 1260E, and 1260F are below the ChLCD layer 1202. When the display 1230 is in the on state light 1172 (see FIG. 11) may be transmitted through the ChLCD 1202 layer. As discussed above with respect to FIG. 11, the keypad elements 1260A, 1260B, 1260C, 1260D, 1260E, and 1260F can be viewed through the ChLCD layer in the on state in low ambient, or in the off state in high ambient light. That is, the keypad element icons 1272A, 1272B, 1272G and 1272E are visible through the ChLCD 1202 layer by the LED light when an LED of a keypad element is on or through the polarizer 1166 (see FIG. 11) in front of the keypad elements 1260A, 1260B, 1260C, 1260D, 1260E, and 1260F. Either way, keypad elements icons 1272A, 1272B, 1272G and 1272E are depicted as visible through the ChLCD layer 1230. That is the pixilated ChLCD can be in both the reflective state and the transmissive state.

Figure 13:
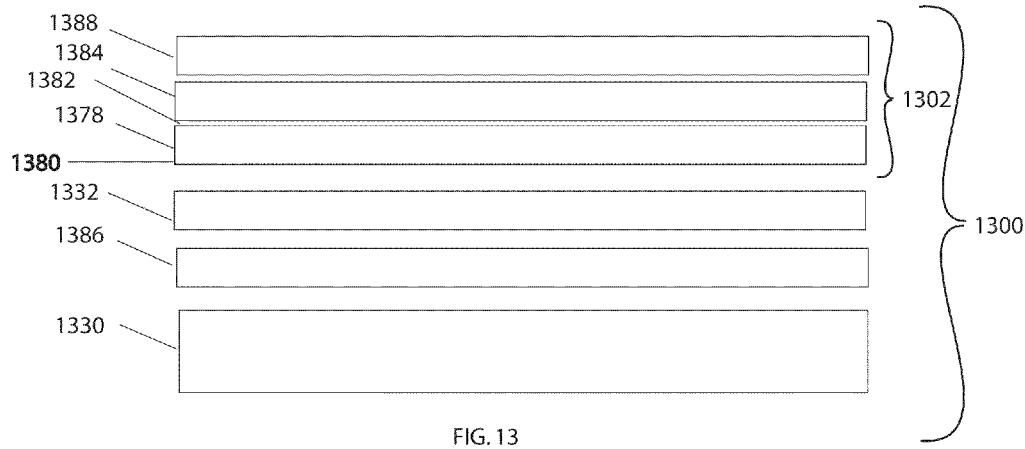
FIG. 13 depicts an embodiment of a display where the cholesteric layer includes at least one sub-layer containing cholesteric material having a bottom side facing the display and a top side, the sub-layer containing cholesteric material tuned to a particular colored reflective state and where a color filter layer is positioned on the top side.

FIG. 13 depicts the display 1300 where the flexible ChLCD cholesteric layer 1302 includes at least one sub-layer 1378 containing cholesteric material having a bottom side 1380 facing the display 1330 and a top side 1382, the sub-layer 1378 containing cholesteric material tuned to a particular colored reflective state and where a color filter layer 1384 is positioned on the top side of the sub-layer. The λ/4 retardation film layer 1332 is between the ChLCD 1302 and the display 1330. In this and other embodiments it is possible for the ChLCD 1302 to switch between various colors. The disclosed arrangements of ChLCD layers 1302 is applicable for both display windows and Skin Change applications with different combinations of optical films. It is understood that the disclosed embodiments and various extensions of disclosed embodiments is directly applicable to Emotional Morphing (skin change) technology. Skin change technology refers to the use of electro-optical materials to change the appearance of portable electronic devices by electrical signal. For example, the housing of an exemplary device, a cell phone, is fabricated from a thin transparent protective polymer. Underneath this polymer, an electro-optical module, for example a cholesteric liquid crystal module, is positioned. The color or patterns depicted on the CHLCD can be changed electronically to customize the appearance of the phone. A full range of colors can be presented on the housing using a three layer stack of cholesteric liquid crystal modules with each layer containing a primary color (red, green, blue), and the ability to grayscale the appearance of a color. Skin change technology is applied to inactive surfaces of a portable electronic device, but for a more homogeneous look, it can also be used over keypads and displays.

The color filter 1384 can improve the appearance of the reflective and colored cholesteric planar state. Cholesteric liquid crystal 1302 produces color by diffraction, and in additional to the main diffractive wavelength, it intrinsically contains side-band peaks which produce a broad overall spectrum. This leads to color shifts versus viewing angle, and an orange-red color instead of red. In the particular case of stacked ChLCD layers which are tuned to produce a full color gamut using a typical mixture of red, green, and blue primaries, a true red is highly desired. The red filter layer is valuable interspersed between the layers.

The orange-red color of "red" cholesteric liquid crystals occurs as the human eye's sensitivity to red drops off dramatically with increasing wavelength. The eye is substantially more sensitive to 600 nm wavelengths than 650 nm wavelengths. The broad peak of cholesteric material extends into the 580 to 620 nm region of the spectrum, and the sum total of this spectral contribution and the >620 nm red contribution produces a copper tinge to the red. The lack of a pure red greatly reduces the saturation of the red color, a very important color in the consumer's minds. The color palette may be enhanced by combining the contributions (color mixing) from the red, green, and blue stacked modules. In one embodiment, a filter can be used above the red CHLCD sublayer, but below any other ChLCD sub-layers, to eliminate the orange contribution.

When colors are produces via diffraction, the color typically shifts with viewing angle. Using red CHLCD as an example, the color shifts from red to a more yellow color, effectively washing out the redness. With the filter such as notch filter 1384 in place, the smaller wavelength components are removed, allowing continued perception of a saturated red. A feature of human perception is that a mustard yellow color can contain the entire spectrum of candy-apple red wavelengths, yet it appears yellow just from the contributions of photons in 580-620 nm range. If the 580-620 nm range is removed yellow changes to candy-apple red.

A notch filter 1384 may be used in combination with a ChLCD module 1300 over a display or an LCD 1330. Black paint, typically applied to the back of a ChLCD module to absorb residual light, is omitted from the area over the display. The display itself (LCD, OLED, CRT, PDP) is black in the off state and acts as this layer. When the display is activated, the ChLCD layer is driven into the homeotropic (transparent) state to provide good transmission. The notch filter 1384 absorbs light only in the 580-620 nm range so that the other colors in the display can penetrate the ChLCD module and be viewed. The use of a notch filter 1384 may provide the use of trichromatic generalization assumption used to construct colors for a human's eyes from three primary colors used in color displays. The red-orange color arising from the red cholesteric mixture arises from spectral contributions between 580 nm and 620 nm. However, an orange sensation produced by an LCD from red and green primaries, includes very little intensity in this region. The eyes' cone detectors have overlapping sensitivity in this region, and the brain interprets the overlap as orange even if the 'orange' wavelengths are nearly absent. Because of this, it is possible to use a narrow absorbing filter in the 580 to 620 nm range to provide a red ChLCD color, yet negligibly affect the color from the LCD 1330 or emissive display. Any color variations can be accommodated by tuning the color output from the LCD or emissive display to account for absorption in this region. Moreover, in reflection mode, the filter acts twice to purify the red. When the display 1330 is transmitting through the ChLCD module 1300, the filter acts only once, reducing the small distortion that it contributes. The ChLCD 1302 may be a wide band, accepting all color of light from the LCD, e.g., reverse dispersion. A sub-layer 1378 may be independent of the ChLCD 1302. The substrate of the ChLCD 1302 may therefore have low birefringence. Wide band ChLCD 1302 can be obtained by pitch gradient (polymer stabilized) or a multiple layer stack 1300 to cover the visible band. With ChLCD 1302, color morphing may be achieved with thinner package.

Referring back to FIG. 13, in one embodiment, the sub-layer 1378 containing cholesteric material can be tuned to a red-colored reflective state, and the color filter layer 1384 is a notch filter which is configured to absorb light between a range of approximately 580-620 nm. The display device can further include at least one chromatic filter 1386 that compensates for absorption of light by the notch filter 1384. The display device 1300 may further include at least one additional sub-layer 1388 containing cholesteric material positioned on the top side 1382 of the at least one sub-layer 1378 containing cholesteric material, the additional sub-layer 1388 containing cholesteric material that is tuned to have a reflected state wavelength shorter than red and where the notch filter layer 1384 is positioned between the at least one sub-layer 1378 and the additional sub-layer 1388.

Thin, flexible ChLCD 1302 substrates, as disclosed, may be utilized for both creating bistable displays over LCD displays for a combination display that provides both 'always-on' and video content and changing the colors and patterns of any type of housing or component for any type of device.

As disclosed, a color-changing surface which can be placed over the top of a display 1330 with negligible impact on the viewing quality of the display 1330. A red color filter may not interfere with the sensation of green by adding the filter component such as notch filter 1384 into the multilayer stack 1300, and specifying that the red layer is be the bottommost layer 1378. The notch filter layer may also be placed over a keypad to enhance the color of the ChLCD, while avoiding absorption of light from the emissive keypad elements such as LEDs.

It is desirable to bond all layers together with good optical matching so that there are not reflections at the interface which would wash-out the cholesteric LCD colors. In some cases, gaps must be left between the LCD and other layers to improve impact resistance of the LCD in the portable electronic device. It is desirable to have anti-reflection coatings at these interfaces to reduce interface reflection.

Figure 14:
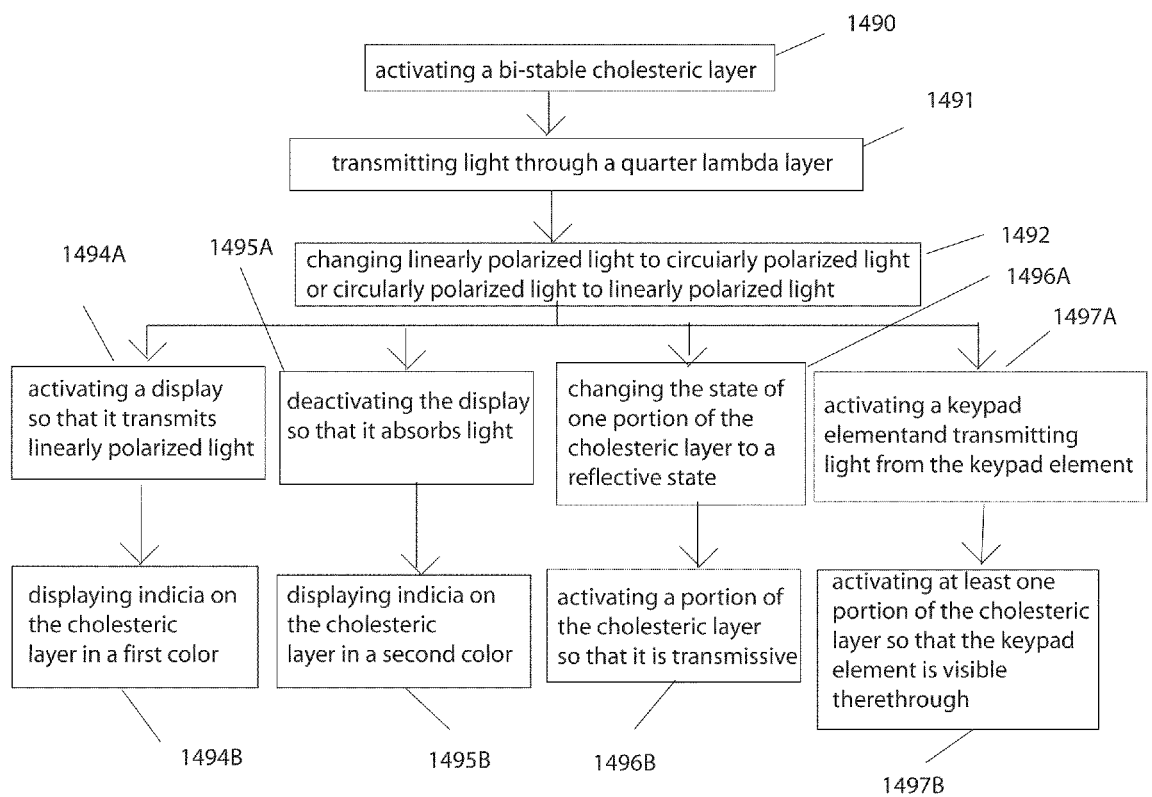
FIG. 14 is a flowchart depicting an embodiment of a method that can include various steps described above of a display device.

FIG. 14 is a flowchart depicting an embodiment of a method that can include various steps described above of a ChLCD display device. A display apparatus can include an LCD display configured to transmit linearly polarized light in an on state and to absorb linearly polarized light in an off state. Steps of a method can include activating 1490 a bi-stable cholesteric layer configured to have a reflective state being a stable state, a lower transmissivity state being a stable state and a high transmissivity state requiring power to maintain the high transmissivity state and configured to reflect a circularly polarized light with a particular handedness in the reflective state, wherein activating the cholesteric layer changes the state of the cholesteric layer so that it is one of a reflective state, a high transmissivity state and a lower transmissivity state and transmitting 1491 light through a single quarter lambda layer positioned between the display and the cholesteric layer, the single quarter lambda layer being configured to change 1492 linearly polarized light to the circularly polarized light and to change the circularly polarized light to linearly polarized light.

The method can include activating 1490 the cholesteric layer so the cholesteric layer is in at least one of a high transmissivity state and a lower transmissivity state and activating 1494A the display so that it transmits linearly polarized light 1494B displaying indicia thereon the cholesteric layer in a first color (see FIG. 6). The method can include activating 1490 the cholesteric layer, the cholesteric layer is in at least one of a high transmissivity state and a lower transmissivity state deactivating 1495A the display so that it absorbs light displaying 1495B indicia thereon the cholesteric layer in a second color (see FIG. 8).

Depending upon the application, that is what is to be displayed ultimately, the method can include changing 1496A the state of at least a portion of the cholesteric layer to the reflective state and activating 1496B at least a portion of the cholesteric layer to at least one of high transmissivity state and lower transmissivity state so that the display is visible therethrough.

As discussed, a keypad element may be adjacent the display, and the cholesteric layer and the single quarter lambda layer are layered with the keypad element, so that a method can include activating 1497A a keypad element, transmitting light from the keypad element through an absorptive polarizer layer configured to absorb a particular linear light, the absorptive polarizer layer between the keypad element and the a single quarter lambda layer and activating 1497B at least a portion of the cholesteric layer to at least one of high transmissivity state and lower transmissivity state so that the keypad element is visible therethrough (see FIG. 12).

The morphing effect is provided by a "switchable" lens or shutter. A reflective morphable display with multi-layered depth viewing, low power consumption and few components is highly desirable. A benefit of ChLCD is that it is thickness insensitive and mechanically durable. Additionally, a mirror-like morphable display that may true red and other vivid colors is also highly desirable. Disclosed is a bi-stable reflective cholesteric liquid display crystal (ChLCD) layered in combination with a display device and a quarter lambda ($\lambda/4$) retardation film layer. Disclosed are embodiments in which it is possible for the ChLCD to switch between various colors. The disclosed arrangements of ChLCD layers is applicable for both display windows and Phone Skin Change applications with different combinations of optical films. The disclosed embodiments and various extensions of disclosed embodiments are directly applicable to Emotional Morphing (phone-skin change) technology.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A display comprising:
  a display device configured to transmit linearly polarized light in an on state and to absorb linearly polarized light in an off state;
  a bi-stable cholesteric (ChLCD) layer configured to have a reflective state being a stable state, a lower transmissivity state being a stable state, and a high transmissivity state requiring power to maintain the high transmissivity state, the ChLCD layer being configured to reflect a circularly polarized light with a particular handedness in the reflective state;
  a single quarter lambda layer positioned between the display and the cholesteric layer configured to change linearly polarized light to light being the circularly polarized light and to change the circularly polarized light transmitted to light being linearly polarized light.

2. The display of claim 1 wherein the display device is a liquid crystal display.

3. The display of claim 1 wherein the quarter lambda layer and the display device are configured to create an absorbing background for the ChLCD layer, wherein the bi-stable ChLCD layer is configured to provide always-on information 4. The display of claim 1 wherein the cholesteric layer is configured to display indicia.

5. The display of claim 1, wherein the cholesteric layer comprises at least one sub-layer containing cholesteric material having a bottom side facing the display and a top side, the sub-layer containing cholesteric material tuned to a particular colored reflective state and wherein a color filter layer is positioned on the top side.

6. The display of claim 1 wherein the cholesteric layer comprises at least one sub-layer containing cholesteric material having a bottom side facing the display and a top side, the sub-layer containing cholesteric material tuned to a red-colored reflective state, and wherein a notch filter layer is positioned on the top side and is configured to absorb light between a range of approximately 580-620 nm.

7. The display of claim 6 further comprising: the display device including at least one chromatic filter that compensates for absorption of light by the notch filter.

8. The display of claim 7 further comprising:
at least one additional sub-layer containing cholesteric material positioned on the top side of the at least one sub-layer containing cholesteric material,
said additional sub-layer containing cholesteric material is tuned to have a reflected state wavelength shorter than red wavelengths,
wherein the notch filter layer is positioned between the at least one sub-layer and the additional sub-layer.

9. The display of claim 1 further comprising:
a keypad element adjacent the display device; an absorptive polarizer layer configured to absorb light having a particular linear polarization,
the absorptive polarizer layer positioned between the keypad element and the single quarter lambda layer.

10. The display of claim 9 further comprising:
a dual brightness enhancement film positioned between the keypad element and the absorptive polarizer layer.

11. A display comprising:
a keypad element;
a bi-stable cholesteric layer configured to have a reflective state being a stable state, a lower transmissivity state being a stable state and a high transmissivity state requiring power to maintain the high transmissivity state and configured to reflect a circularly polarized light with a particular handedness in the reflective state;
a single quarter lambda layer positioned between the keypad element and the cholesteric layer configured to change linearly polarized light transmitted from the keypad element to light being the circularly polarized light and to change the circularly polarized light transmitted from the cholesteric layer to linearly polarized light; and
an absorptive polarizer layer configured to absorb a particular linear light positioned between the keypad element and the a single quarter lambda layer.

12. The display of claim 11, wherein the cholesteric layer comprises at least one sub-layer containing cholesteric material having a bottom side facing the display and a top side, the sub-layer containing cholesteric material tuned to a particular colored reflective state and wherein a color filter layer is positioned on the top side.

13. The display of claim 11 further comprising:
a dual brightness enhancement film positioned between the keypad element and the absorptive polarizer layer.

14. A method of display including a display device configured to transmit linearly polarized light in an on state and to absorb linearly polarized light in an off state, the method comprising:
activating a bi-stable cholesteric layer configured to have a reflective state being a stable state, a lower transmissivity state being a stable state and a high transmissivity state requiring power to maintain the high transmissivity state and configured to reflect a circularly polarized light with a particular handedness in the reflective state,
wherein activating the cholesteric layer changes the state of the cholesteric layer so that it is one of a reflective state, a high transmissivity state and a lower transmissivity state;
transmitting light through a single quarter lambda layer positioned between the display and the cholesteric layer, the single quarter lambda layer being configured to change linearly polarized light to the circularly polarized light and to change the circularly polarized light to linearly polarized light.

15. The method of claim 14, wherein by activating the cholesteric layer, the cholesteric layer is in at least one of a high transmissivity state and a lower transmissivity state, the method further comprising:
activating the display so that it transmits linearly polarized light; and
displaying indicia thereon the cholesteric layer in a first color.

16. The method of claim 14 wherein by activating the cholesteric layer, the cholesteric layer is in at least one of a high transmissivity state and a lower transmissivity state, the method further comprising:
deactivating the display so that it absorbs light; and
displaying indicia thereon the cholesteric layer in a second color.

17. The method of claim 14, further comprising:
changing the state of at least a portion of the cholesteric layer to the reflective state.

18. The method of claim 14, further comprising:
activating at least a portion of the cholesteric layer to at least one of high transmissivity state and lower transmissivity state so that the display is visible therethrough.

19. The method of claim 14 wherein a keypad element is adjacent the display, and the cholesteric layer and the single quarter lambda layer are layered with the keypad element, the method, further comprising:
activating a keypad element; and
transmitting light from the keypad element through an absorptive polarizer layer configured to absorb a particular linear light, the absorptive polarizer layer between the keypad element and the a single quarter lambda layer.

20. The method of claim 19, further comprising: activating at least a portion of the cholesteric layer to at least one of high transmissivity state and lower transmissivity state so that the keypad element is visible therethrough.

* * * * *